(12) United States Patent
Tewari

(10) Patent No.: US 11,226,775 B2
(45) Date of Patent: Jan. 18, 2022

(54) EXTRACTING DRIVE LETTERS FOR PARTITIONS IN AN OFFLINE VIRTUAL DISK

(71) Applicant: EMC IP Holding Company LLC, Hopkinton, MA (US)

(72) Inventor: Abinas Tewari, Charlotte, NC (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/803,878

(22) Filed: Feb. 27, 2020

(65) Prior Publication Data
US 2021/0271427 A1 Sep. 2, 2021

(51) Int. Cl.
G06F 3/06 (2006.01)
G06F 9/445 (2018.01)
G06F 9/4401 (2018.01)
G06F 9/455 (2018.01)

(52) U.S. Cl.
CPC .......... *G06F 3/0665* (2013.01); *G06F 3/0604* (2013.01); *G06F 3/067* (2013.01); *G06F 3/0644* (2013.01); *G06F 3/0653* (2013.01); *G06F 3/0659* (2013.01); *G06F 9/4406* (2013.01); *G06F 9/44505* (2013.01); *G06F 9/45558* (2013.01); *G06F 2009/45575* (2013.01); *G06F 2009/45583* (2013.01)

(58) Field of Classification Search
CPC .. G06F 3/0665; G06F 9/45558; G06F 3/0653; G06F 9/4406; G06F 9/44505; G06F 3/0604; G06F 3/0644; G06F 3/067; G06F 3/0659; G06F 2009/45575; G06F 2009/45583

USPC ......................................................... 711/173
See application file for complete search history.

(56) References Cited

U.S. PATENT DOCUMENTS 8,185,684 B1 * 5/2012 Naftel ................ G06F 9/45558
711/6
2007/0233842 A1 * 10/2007 Roberts ................ H04L 67/125
709/223

OTHER PUBLICATIONS

NPL: Simon Key, "Windows Drive Letter Assignments", Sep. 2019 (Year: 2019).*
NPL: Dawid Zamirski, "get windows drive letters for GPT disks", Feb. 6, 2016 (Year: 2016).*
Simon Key—"Windows Drive Letter Assignments", Jun. 11, 2015 (6:30PM). (Year: 2015).*

* cited by examiner

*Primary Examiner* — David Yi
*Assistant Examiner* — Zubair Ahmed
(74) *Attorney, Agent, or Firm* — Staniford Tomita LLP

(57) ABSTRACT

A virtual disk file, represented by a virtual disk that is offline, is scanned to obtain a binary signature indicating the virtual disk as being an MBR or GPT partitioned disk type. A disk signature is obtained for the MBR partitioned disk. A volume GUID is obtained for the GPT partitioned disk. Partitions on the virtual disk are identified. A system registry hive file is located. The system registry hive file is read to obtain a drive letter and one or more other values associated with the drive letter. A correlation is performed of the disk signature or volume GUID against the one or more other values associated with the drive letter. Based on the correlation, the drive letter is mapped to an identified partition.

18 Claims, 9 Drawing Sheets

```
src-vio-164:~/doms/1 # # /opt/emc/search-client/bin/Avexget.sh WINDOWS/system32/config/system MountedDevices
"\??\Volume{0a7ea85a-dd82-11e0-8874-806d6f6e69c3}"=hex(3):94,27,95,27,00,7e,00,00,00,00,00,00
"\DosDevices\C:"=hex(3):94,27,95,27,00,7e,00,00,00,00,00,00
"\DosDevices\E:"=hex(3):44,4d,49,4f,3a,49,44,3a,69,e9,a1,59,45,e0,9a,49,00,38,3f,0a,05,d6,db,c1
"\DosDevices\F:"=hex(3):44,4d,49,4f,3a,49,44,3a,32,38,ce,da,d3,8e,a8,4c,ba,53,5c,14,81,71,ed,b7
```

FIG. 7 ← 705

The MountedDevices registry entry will have one of the following types of values:
- 12 byte standard dos devices partition values
- 24 byte GPT dynamic device partition values
- longer values (beginning with 5c or 5a) that typically designate removable media

Example: Analyzing 12-Byte DosDevices Entry

"\\DosDevices\\C:"=hex(3):46,00,54,46,00,00,50,06,00,00,00,00

— 810
— 815 Disk Signature
— 820 Partition Offset (little endian)

FIG. 8A

Example: Analyzing 24-Byte DosDevices Entry

"\\DosDevices\\E:"=hex(3):44,4d,49,4f,3a,49,44,3a,69,e9,a1,59,45,e0,9a,49,00,38,3f,0a,05,d6,db,c1

— 850
— 855 DMIO:ID: signature
— 860 Volume GUID

FIG. 8B

EXTRACTING DRIVE LETTERS FOR PARTITIONS IN AN OFFLINE VIRTUAL DISK

TECHNICAL FIELD

The present invention relates generally to information processing systems, and more particularly to discovering drive letters from an offline virtual disk.

BACKGROUND

Virtual machines are abstractions of physical computers. Virtual machines use virtual disks which, likewise, are abstractions of physical storage devices. In particular, virtual machines write to virtual disks and the writes are stored in virtual disk files. Virtual disks, like physical storage devices, can be divided into various partitions. An operating system may assign drive letters to one or more partitions. Partitions having assigned drive letters may be referred to as volumes and may be made accessible to applications that may be executing on the virtual machines.

Virtual machines may be backed up by backing up the corresponding virtual disk files. Part of the backup process includes indexing or cataloging in order to identify files, folders, and the volumes, and, in particular, volume drive letters to which the files and folders belong. Typically, the process for discovering drive letters involves agents running in virtual machines. The agent queries the operating system to gather the drive information. This discovery process, however, requires agents to be installed in the virtual machines and corresponding virtual disks to be online. Running agents and bringing the virtual disks online can involve a significant amount of overhead, especially in cases involving hundreds or even thousands of virtual disks. There is a need for improved systems and techniques for discovering drive information from virtual disks while the virtual disks remain offline.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF DESCRIPTION OF THE FIGURES

In the following drawings like reference numerals designate like structural elements. Although the figures depict various examples, the one or more embodiments and implementations described herein are not limited to the examples depicted in the figures.

FIG. 7 shows an example of the information stored in the system registry hive file for the MountedDevices key, according to one or more embodiments.

FIG. 8A shows an example of analyzing a 12-byte Dos-Devices entry, according to one or more embodiments.

FIG. 8B shows an example of analyzing a 24-byte Dos-Devices entry, according to one or more embodiments.

DETAILED DESCRIPTION

Figure 1:
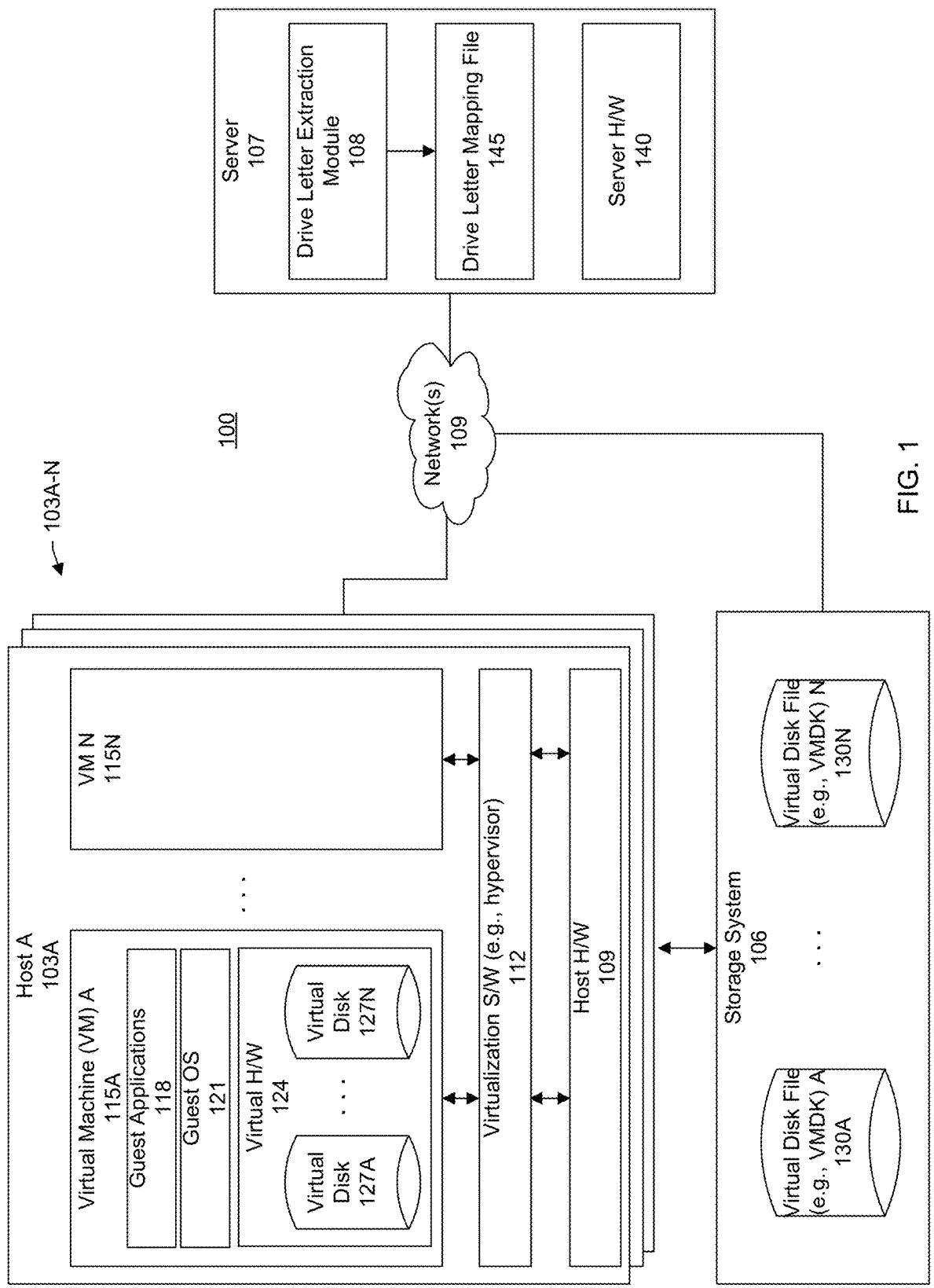
FIG. 1 shows a block diagram of an information processing system for extracting drive letters of partitions from virtual disks while the virtual disks are offline, according to one or more embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention. Aspects of the one or more embodiments described herein may be implemented on one or more computers executing software instructions, and the computers may be networked in a client-server arrangement or similar distributed computer network. In this disclosure, variables such as N, X, Y, and other similar index variables are assumed to be arbitrary positive integers greater than or equal to two.

Disclosed herein are methods and systems for extracting drive letters for partitions in an offline virtual disk. In a specific embodiment, the partitions are created according to the New Technology File System (NTFS®) format standard as used by the Windows® Operating System (OS) from Microsoft Corporation of Redmond, Wash.; and the virtual disk corresponds to a virtual disk file formatted as a virtual machine disk (VMDK) file. VMDK is a file format that describes containers for virtual hard disk drives to be used in virtual machines.

Shrekking Onions is a moniker given to the process of crawling offline disks and building a catalog of directory and file metadata. Since the disk need not be online and the fact that this process requires relatively little processing power and time to complete it is ideal for real-time cataloging during the backup process.

One of the deficiencies of this extraction process is that for Windows NTFS® file systems, the drive letter for each volume is not known. Consequently, a separate process must be used, or user input must be solicited to determine which drive a set of files or folders belong to, for the purposes of restoring them.

In a specific embodiment, systems and techniques allow for the discovery of drive information from an offline disk, such as a VMDK. These systems and techniques to discover the drive information, while the virtual disk is offline or virtual machine associated with the virtual disk is powered off, may be used during the Shrekking Onions metadata extraction process, or when reading a Windows block device during the block-based backup process.

FIG. 1 shows a block diagram of an information processing system 100 within which such methods and systems may be implemented according to one or more embodiments. In the example shown in FIG. 1, there are a set host computers 103A-N, a storage system 106, and a server 107 having a drive letter extraction module 108. A network 109 communicatively connects the various components of the information processing system together.

A host, such as host 103A, may be a general purpose computer system. The host includes a hardware platform 109. The hardware platform includes a processor, memory, storage, network interface, and other hardware components that may be interconnected by a bus or other interconnection scheme.

Virtualization software 112 (e.g., hypervisor or virtual machine monitor (VMM)) may be installed on top of the host hardware platform. A host uses the virtualization software to host and run any number of virtual machines (VMs) 115A-N. The virtual machines access data stored on the storage system such as via a network interface card (NIC) connecting the host to the storage system.

The storage system may include one or more storage arrays. Each storage array may include any number of hard disks (HDD), solid state drives (SSDs), or other storage medium. The storage system may provide network attached storage (NAS) or block-based storage over a storage area network (SAN).

A virtual machine, such as a virtual machine 115A, is a software implementation of a physical machine (e.g., computer) that executes programs like a physical machine. The virtual machine may include guest applications 118, a guest operating system (OS) 121, and virtual hardware 124. An example of a guest operating system includes Microsoft Windows®. The guest OS may include a file system, such as NTFS®, which interfaces with the virtual hardware. The virtual hardware represents a hardware state of the virtual machine. The virtual hardware may include virtual disks 127A-N, virtual processors, virtual system memory, and various virtual devices for which the guest operating system includes corresponding drivers.

The storage system stores virtual disk files 130A-N (e.g., VMDK files) which are represented by virtual disks 127A-N. In particular, the virtualization software provides to the guest OS in a virtual machine the appearance of disk storage via virtual disks 127A-N. The virtual disks provide an abstraction of a real or physical disk having, for example, a linear arrangement of sectors, to the guest OS. When the virtual machines are powered on, the virtualization software, allows the virtual machine to mount the virtual disk files as virtual disks.

Mounting is a process by which the operating system makes files and directories on the storage device (e.g., virtual disk) available for applications to access via the file system. An opposite process of mounting is called unmounting, in which the operating system cuts off all user access to files and directories on the mount point, writes the remaining queue of user data to the disk, refreshes file system metadata, then relinquishes access to the disk. Typically, when the virtual machine is shutting down, every mounted disk will undergo an unmounting process to ensure that all queued data is written, and to preserve integrity of file system structure on the disk.

Partitioning refers to creating regions on disk, so that each region can be managed separately. These regions may be referred to as partitions. Partitioning is typically the first step in preparing a newly installed disk, before any file system is created. The disk stores the information about the partitions' locations and sizes in a designated area that the operating system reads before any other part of the disk. Each partition then appears to the operating system as a distinct "logical" disk that uses part of the actual disk. Formatting a partition with a file system allows data to be written to the partition. Specifically, drive letters may be assigned to one or more partitions, which may then be referred to as volumes or drives, which in turn can be recognized by the application programs.

A drive letter assignment allows multiple highest-level namespaces. Drive letter assignment is thus a process of using letters to name the roots of the "forest" representing the file system; each volume holds an independent "tree." A disk may have multiple partitions and not all partitions may be assigned a drive letter. For example, hidden partitions such as recovery and restore partitions may not be assigned a drive letter. Of particular interest, however, are partitions having assigned drive letters. Being able to map between drive letters and corresponding partitions or volumes can, among other benefits, allow for creating an index of files and volumes to which the files belong and can facilitate recovery of the files to their proper location.

A VM may include an agent that queries the OS to gather drive letter information. This requires, however, installing the agent in the VM, the VM to be turned on and virtual disks to be online. Installing agents, bringing VMs online from an off state in order to run the agents requires time and resources. The time and resources can be significant when a cluster may include hundreds or even thousands of VMs. It would be desirable to map drive letters to their corresponding volumes without having to install agents, mount the operating system and bring the virtual disks online or turned on. In other words, it would be desirable to be able to perform the mapping while the virtual disks remain offline.

Server 107, like hosts 103A-N, may be a general purpose computer system. For example, the server includes a hardware platform 140 that may include a processor, memory, storage, network interface, and other hardware components that may be interconnected by a bus or other interconnection scheme. Drive letter extraction module 108 is installed on the server. The drive letter extraction module is responsible for examining and analyzing the virtual disk files stored in the storage system to return or discover a mapping of drive letters and corresponding volumes, while the virtual disks representing the virtual disk files are offline.

In a specific embodiment, the drive letter extraction module may generate and output a drive letter mapping file 145. The drive letter mapping file may include a listing of drive letters and corresponding partitions that the drive letters map to. The drive letter mapping file may be formatted as a text file or other file format. The drive letter mapping file may be provided to a cataloging module of a backup application for indexing files and folders to the corresponding drive that they belong to. In another specific embodiment, the drive letter extraction module may expose an application programming interface (API) through which the drive letter information may be returned programmatically to another requesting application program.

Table A below shows a brief flow for drive letter (e.g., NTFS® drive letter) extraction according to a specific embodiment.

TABLE A

| Step | Description |
|------|-------------|
| 1 | Ascertaining the type of partition (GPT or MBR) of each partition and finding the disk signature or volume GUID for each volume. |
| 2 | Extracting the SYSTEM hive file from the disk volume. |
| 3 | Getting the MountedDevices registry key. |
| 4 | Analyzing the values in this registry entry to determine the drive letter to map to each volume. |

Figure 2:
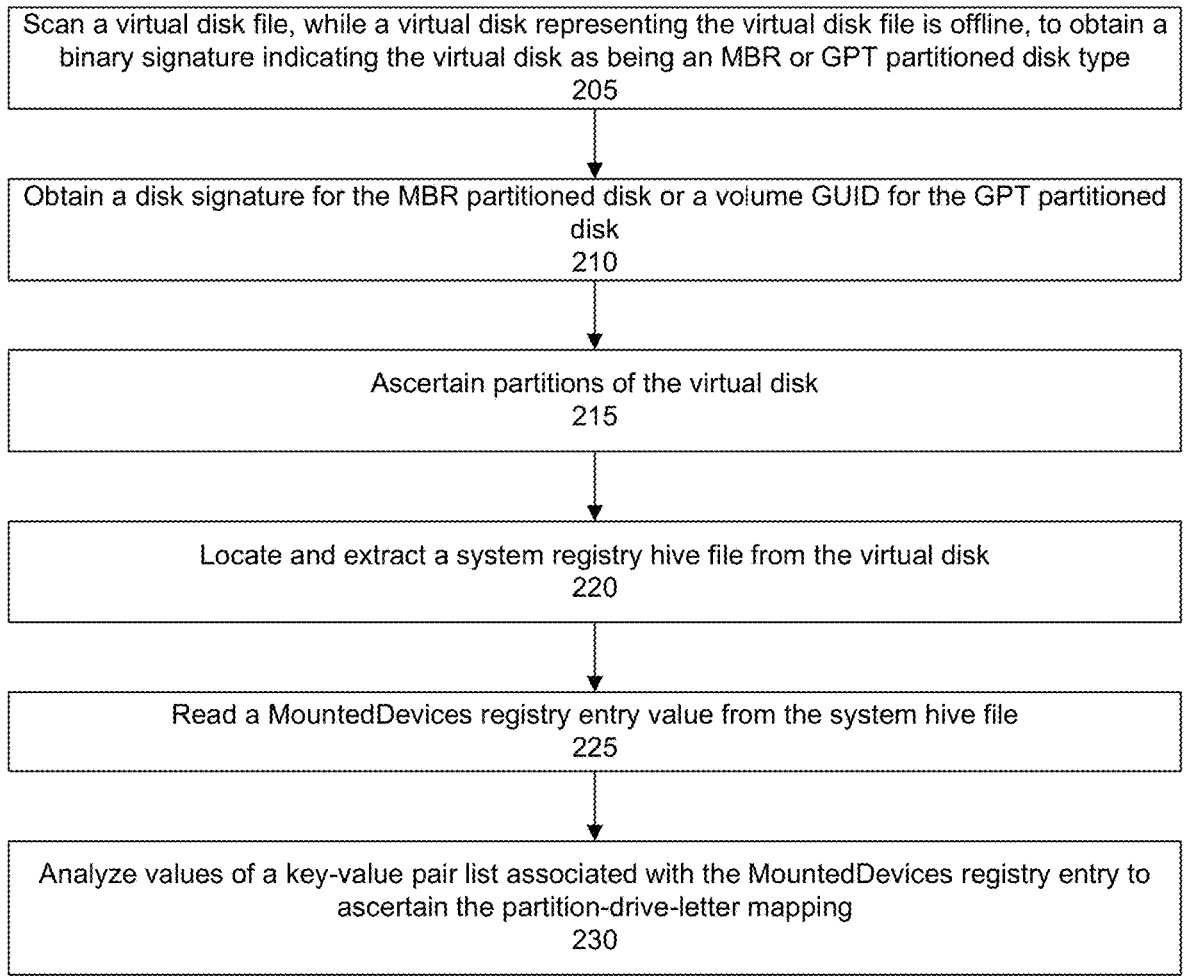
FIG. 2 shows an overall flow of a process for the drive letter extraction process, according to one or more embodiments.

FIG. 2 shows a flow diagram of a technique for offline extraction of drive letters that map to partitions. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other embodiments may not be exactly the same as the steps presented and may be modified or altered as appropriate for a particular process, application, or based on the data.

In a step 205, a virtual disk file is scanned, while a virtual disk representing the virtual disk file is offline, to obtain a binary signature indicating the virtual disk as being a Master Boot Record (MBR) partitioned disk type or a Globally Unique Identifier Partition Table (GPT) partitioned disk type.

MBR and GPT are two types of disk partition schemes provided by Microsoft Windows®. MBR and GPT are two different ways of storing the partitioning information on a disk. The partitioning information includes information indicating where partitions start and end so that the operating system knows which sectors belong to which partition. MBR, which was introduced in the early 1980s, provides for a boot sector located at the beginning of a drive. This sector contains a boot loader for the installed operating system and information about the drive's partitions. There are some limitations with the MBR format. For example, MBR supports a maximum of four primary partitions and has a 2 terabyte (TB) disk size limit. GPT is a newer standard that allows for much larger disks, many more partitions, and is generally considered more robust than MBR. Nonetheless, MBR partitioned disk types remain in wide-use.

Figure 3:
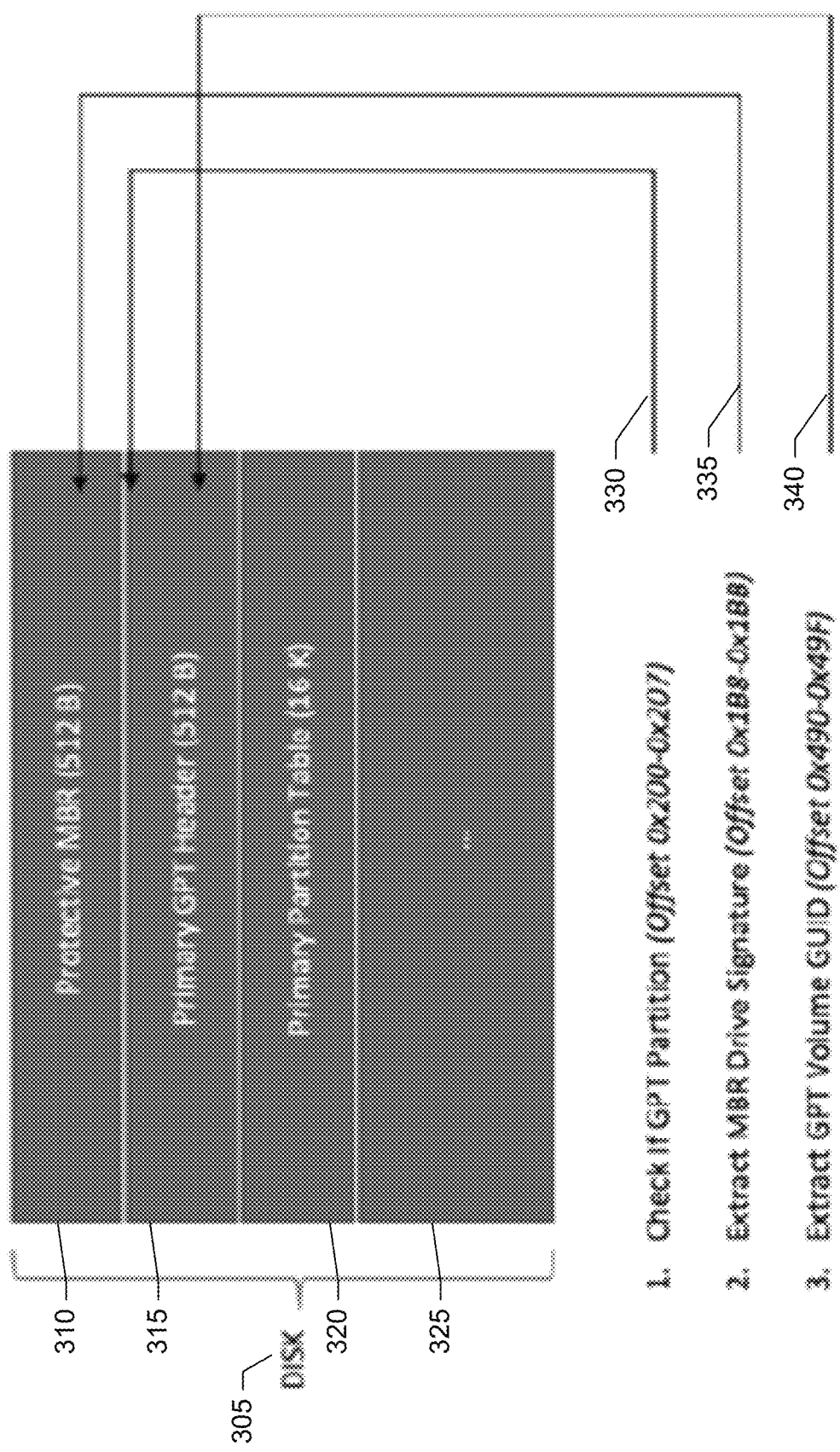
FIG. 3 shows an example of a disk, according to one or more embodiments.

FIG. 3 shows a block diagram of extracting a disk signature or volume GUID from MBR or GPT partition. As shown in the example of FIG. 3, there is a disk 305 having one or more regions including a protective MBR 310, primary GPT header 315, primary partition table 320, and other regions 325. In a specific embodiment, a check 330 may be performed at an offset (e.g., offset 0x200-0x207) to determine the type of partition (e.g., GPT or MBR).

Referring back now to FIG. 2, in a step 210 a disk signature is obtained for the MBR partitioned disk type (e.g., "9A802B99") or a volume GUID for the GPT partitioned disk type (e.g., "22e1b70a-ea2d-11dd-acd9-806e6f6e6963").

The disk signature is a unique ID number that Windows® writes to a specific location inside the Master Boot Record. For MBR partition types, Windows® uses disk signatures to differentiate among storage devices.

For GPT partition types, Windows® provides for a globally unique identifier (GUID) for each partition on a disk, i.e., volume GUID. The volume GUID is assigned the first time the Windows® OS encounters a drive or volume and it does not change. This helps to ensure that Windows® can always uniquely identify a volume. The length of the volume GUID helps to ensure that every GPT partition has its own unique identifier. In contrast, for MBR disk types, two partitions on the same disk may have the same disk signature.

In a specific embodiment, for GPT volumes, 24 bytes are scanned from a known offset (e.g., offset 0x490-0x49F) to determine the GPT Volume GUID. For MBR partitions, 4 bytes at offset 0x01B8 are scanned to determine the disk signature.

FIG. 3 shows an example of extracting 335 an MBR drive signature (offset 0x1B8-0x1BB) and extracting 340 a GPT volume GUID (offset 0x490-0x49F).

Referring back now to FIG. 2, in a step 215, the partitions within the virtual disk file (e.g., VMDK) are identified. In a specific embodiment, the identification includes ascertaining the partition offsets within the VMDK for each partition. In a specific embodiment, the drive letter extraction module uses a command line tool referred to as parted to identify the partitions.

Figure 4:
FIG. 4 shows an example of partition information obtained from a virtual disk or virtual disk file, according to one or more embodiments.

FIG. 4 shows a screenshot of partition information having been outputted to a command line using parted. Boxes have been superimposed over the screenshot to highlight extracted partition information. Such information includes a partition number 410, partition starting offset 415, partition ending offset 420, size 425, type 430, file system 435, and flags 440.

Referring back now to FIG. 2, in a step 220, the system registry hive file (e.g., Windows/System32/config/SYSTEM) is located and extracted from the virtual disk file (e.g., VMDK). The registry is a hierarchical database that stores low-level settings for the Microsoft Windows® operating system. The registry contains information, settings, options, and other values for installed programs and hardware. The registry has a structure similar to Windows® folders and files. Each main folder is named as a hive. Each hive contains sub folders called keys. These keys contain subkeys with configuration values. Whenever a software program, a hardware or a device driver for a newly connected hardware in a Windows®-based computer system is installed, the initial configuration settings of these are stored as keys and values in a system-defined, central hierarchical database repository called the registry or Windows® registry. During the usage of the software or the hardware, the changes made to these configurations are updated in the registry.

Different types of Windows® VMs may store the system registry hive file in different locations. Thus, since any partition in a volume may contain this hive file, one or more or all of the partitions may be iterated through and this extraction command may be attempted with each partition in order to obtain this hive file. In other words, the extraction command may be issued to multiple (e.g., two or more) partitions in order to locate the system registry hive file.

Figure 5:
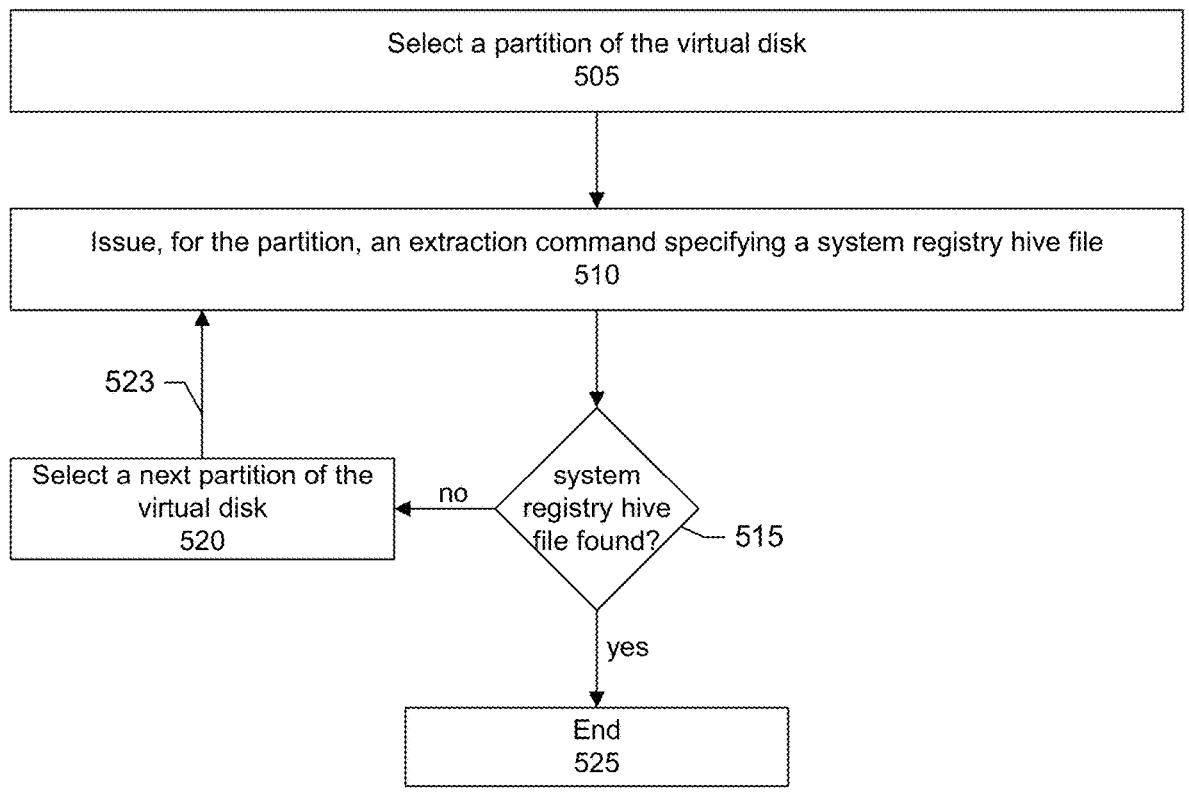
FIG. 5 shows a flow for locating a system registry hive file, according to one or more embodiments.

FIG. 5 shows a flow diagram for locating the system registry hive file. In a step 505, an identified partition is selected. In a step 510, an extraction command specifying the system registry hive file and partition to examine is issued. In a step 515, a determination is made as to whether the system registry hive file was found in the partition. If the system registry hive file was not found in the partition, a next partition is selected (step 520) and the process loops back 523 to make another attempt at extracting the system registry hive file from the next partition. This iterative process may be repeated with each partition until the system registry hive file is found (step 525).

Referring back now to FIG. 2, in a step 225, a MountedDevices registry entry value is read or parsed from the system hive file. In a specific embodiment, a third party library such as Hivex or a similar third party library (e.g., RegRipper, RegFileExporter, or other) is used to read the registry. The MountedDevices key stores information about the various devices and volumes mounted to the (NTFS®) file system.

More specifically, the MountedDevices registry key stores drive letters along with other binary values associated with each drive letter. These other values may include partition offsets. If a device or volume is mounted to the file system, the device or volume may be assigned a drive letter (e.g., "H:\"). The value in the MountedDevices key will then appear in the form "\DosDevices\H:". Not all drive letters, however, may be relevant. For example, when a removable storage device (e.g., USB thumb drive) is connected to the file system, it is also assigned a drive letter and that drive letter will be recorded in the MountedDevices registry key. Therefore, matching or correlating using the other values (e.g., partition offset) contained in the MountedDevices registry key helps to ensure proper mapping of the relevant drive letters to the relevant partitions.

In particular, in a step 230, an analysis is performed of the values in the key-value pair list associated with the MountedDevices registry entry to ascertain the partition-drive-letter mapping. In a specific embodiment, the analysis includes comparing the values parsed from the MountedDevices registry entry against the disk signature and partition offset information for MBR partitioned disk types or against the volume GUID for GPT partitioned disk types to find matches or a correspondence.

Figure 6:
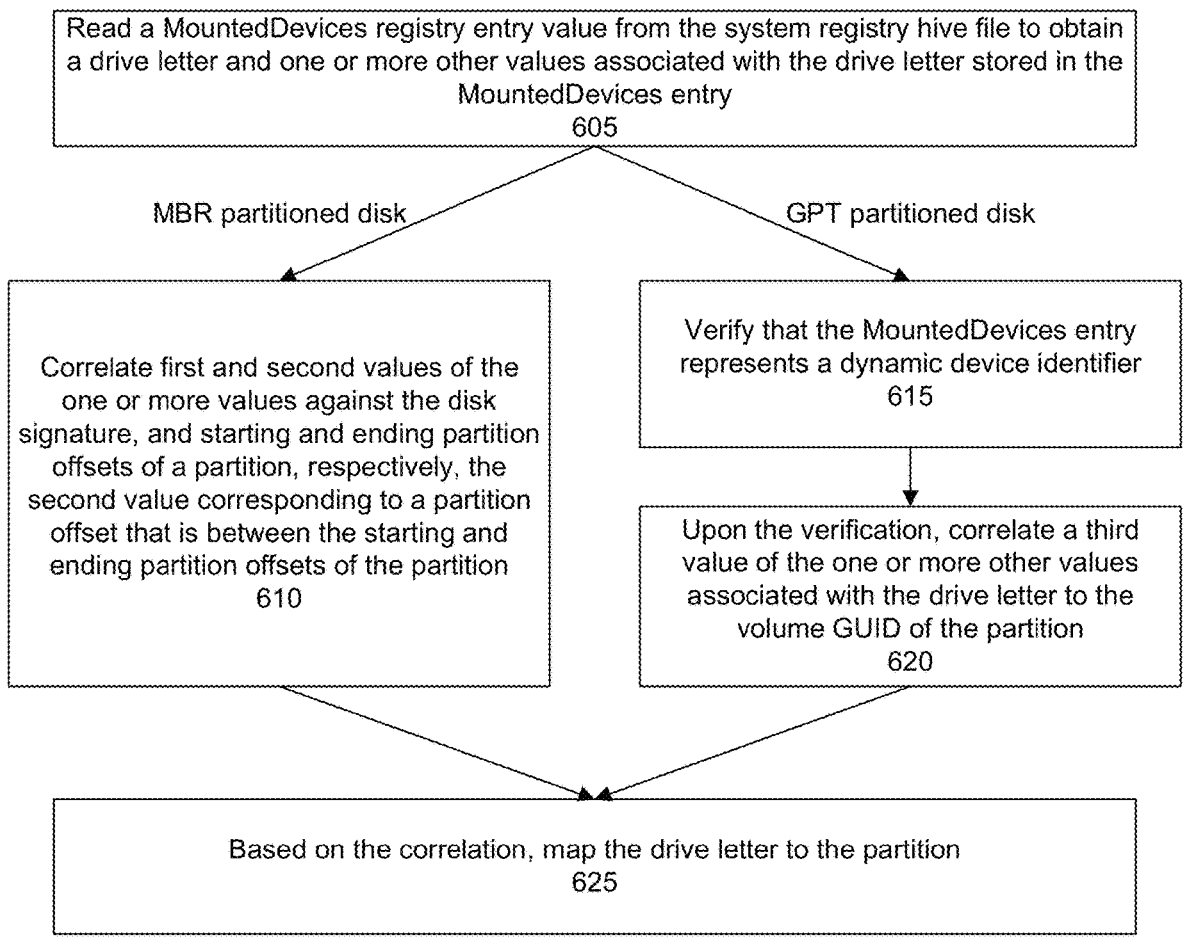
FIG. 6 shows a flow analyzing the system registry hive file and correlating values in the system registry hive file to discover drive letters, according to one or more embodiments.

FIG. 6 shows further detail of a flow diagram for analyzing the MountedDevices registry entry. In a step 605, the MountedDevices registry entry value is read from the system registry hive file to obtain a drive letter and one or more other values associated with the drive letter stored in the MountedDevices entry.

For the MBR partitioned disk type, in a step 610, first and second values of the one or more other values associated with the drive letter are correlated against the disk signature, and starting and ending partition offsets of a partition, respectively, the second value corresponding to a partition offset that is between or within the starting and ending partition offsets of the partition. More particularly, for standard MBR partitions, the MountedDevices registry entry provides a 12 byte value. The first 4 bytes represents the device signature, which should be matched with the device signatures obtained from step 210 (FIG. 2); the next 8 bytes represents the partition offset, which should be matched with the partition offset of each partition, obtained from step 215 (FIG. 2). In a specific embodiment, a match is determined to have occurred when the partition offset value contained in the MountedDevices registry entry falls between the starting and ending partition offset of an identified partition from step 215 (FIG. 2).

Since different partitions on the same disk may have the same device signatures, correlating using the partition offset contained within the data of the MountedDevices registry key helps to identify the relevant drive letter corresponding to the relevant partition.

For GPT partitions, the MountedDevices registry entry provides a 24 byte value. The first 8 bytes should be first checked to ascertain whether it represents the DMIO:ID: dynamic device identifier. If it does, then the next 16 bytes is the volume GUID of that disk, and should be matched against the volume GUID obtained from step 210 (FIG. 2) to match the partition.

More particularly, in a step 615, a verification that MountedDevices entry represents a dynamic device identifier is performed. The verification may include checking as to whether the first 8 bytes includes the DMIO:ID: signature. If the DMIO:ID: signature cannot be found, the process stops or moves to a different set of key-value data. If DMIO:ID: signature is found, the process continues to read the 16-byte volume GUID (i.e., GPT partition-GUID). The verification can help to exclude from the partition-drive-letter mapping removable devices (e.g., USB thumb drives) that may have been used. Checking for the DMIO:ID: signature provides a way to verify (along with the fact that the value is 24 bytes) that the registry entry value contains a 16-byte GPT partition GUID. As discussed, there are other types of values also stored in the MountedDevices registry entry, including USB devices and other removable disks, so the check for the DMIO:ID: signature helps to ensure that the value represents a fixed-disk volume.

In a step 620, a value (e.g., third value) of the one or more other values associated with the drive letter is correlated to the volume GUID of the partition. As discussed before the volume GUID is designed such that every GPT partition is associated with a unique identifier. Thus, for GPT partitions, the value contained in the MountedDevices entry can be directly matched against the volume GUID obtained from step 210 (FIG. 2).

In a step 625, based on the correlation, the drive letter from the MountedDevices registry entry is mapped to the partition. In other words, once the values are correlated or matched, the DosDevices key that represents the drive letter is returned. Each device that Windows® has allocated a drive letter will have its own "\DosDevices\" line. In particular, the drive letter may be mapped to an identified partition for the MBR partitioned disk type or to the volume GUID for the GPT partitioned disk type.

FIG. 7 shows a screen shot 705 from an editor showing the MountedDevices registry entry for an MBR partitioned disk type. The MountedDevices registry entry will have one of the following types of values: 1) 12 byte standard dos devices partition values; 2) 24 byte GPT dynamic device partition values; or 3) longer values (beginning with 5c or 5a) that typically designate removable media.

FIGS. 8A,8B show examples for analyzing the DosDevices entry for MBR and GPT partitioned disk types, respectively. In particular, FIG. 8A shows an example for analyzing the 12-byte DosDevices entry. As shown in the example of FIG. 8A, a 12-byte DosDevices entry 810 includes a disk signature 815 and a partition offset 820 (in little endian order). FIG. 8B shows an example for analyzing the 24-byte DosDevices entry. As shown in the example of FIG. 8B, a 24-byte DosDevices entry 850 includes a DMIO:ID: signature 855 and volume GUID 860.

In a specific embodiment, there is a method comprising: scanning a virtual disk file, while a virtual disk representing the virtual disk file is offline, to obtain a binary signature indicating the virtual disk as being one of a Master Boot Record (MBR) partitioned disk type or a Globally Unique Identifier Partition Table (GPT) partitioned disk type; obtaining a disk signature for the MBR partitioned disk; obtaining a volume Globally Unique Identifier (GUID) for the GPT partitioned disk; identifying partitions of the virtual disk; locating a system registry hive file; reading, from the system registry hive file, a MountedDevices entry to obtain a drive letter and one or more other values associated with the drive letter stored in the MountedDevices entry; correlating one of the disk signature for the MBR partitioned disk or the volume GUID for the GPT partitioned disk against the one or more other values associated with the drive letter stored in the MountedDevices entry; and based on the correlation, mapping the drive letter to an identified partition.

Locating the system registry hive file may further include: selecting a partition; issuing, for the selected partition, an extraction command specifying the system registry hive file; and repeating the selecting a partition and issuing of the extraction command until the system registry hive file is found.

The correlating may further include: when the virtual disk is the MBR partitioned disk type, correlating first and second values of the one or more other values associated with the drive letter against the disk signature, and starting and ending partition offsets of the identified partition, respectively, wherein the second value corresponds to a partition offset that is within the starting and ending partition offsets of the identified partition.

The correlating may further include: when the virtual disk is the GPT partitioned disk type, verifying that the MountedDevices entry represents a dynamic device identifier; and upon the verification, correlating a value of the one or more values associated with the drive letter to the volume GUID of the identified partition.

In a specific embodiment, a virtual machine using the virtual disk is powered off. In a specific embodiment, the partitions include New Technology File System (NTFS) partitions.

In another specific embodiment, there is a method comprising: scanning a virtual disk file, while a virtual disk represented by the virtual disk file is offline, to obtain a binary signature indicating the virtual disk as being one of a Master Boot Record (MBR) partitioned disk type or a Globally Unique Identifier Partition Table (GPT) partitioned disk type; obtaining a disk signature for the MBR partitioned disk; obtaining a volume Globally Unique Identifier (GUID) for the GPT partitioned disk; identifying partitions of the virtual disk; iterating through one or more identified partitions with an extraction command specifying a system registry hive file; reading, from the system registry hive file, a MountedDevices entry to obtain a drive letter and one or more other values associated with the drive letter stored in the MountedDevices entry; when the virtual disk is the MBR partitioned disk type, correlating first and second values of the one or more other values associated with the drive letter against the disk signature and starting and ending partition offsets of an identified partition, respectively, the second value corresponding to a partition offset that is within the starting and ending partition offsets of the identified partition; when the virtual disk is the GPT partitioned disk type, verifying that the MountedDevices entry represents a dynamic device identifier; and upon the verification, correlating a third value of the one or more values associated with the drive letter to the volume GUID of the identified partition; and based on the correlation, mapping the drive letter to the identified partition.

Referring back now to FIG. 1, the network provides a mechanism for allowing the various components of the information processing system to communicate with each other. The network may itself be comprised of many interconnected computer systems and communication links. Communication links may be hardwire links, optical links, satellite or other wireless communications links, wave propagation links, or any other mechanisms for communication of information. Various communication protocols may be used to facilitate communication between the various systems shown in FIG. 1. These communication protocols may include TCP/IP, HTTP protocols, wireless application protocol (WAP), vendor-specific protocols, customized protocols, and others. While in one embodiment, the network is the Internet, in other embodiments, the network may be any suitable communication network including a local area network (LAN), a wide area network (WAN), a wireless network, an intranet, a private network, a public network, a switched network, and combinations of these, and the like.

Figure 9:
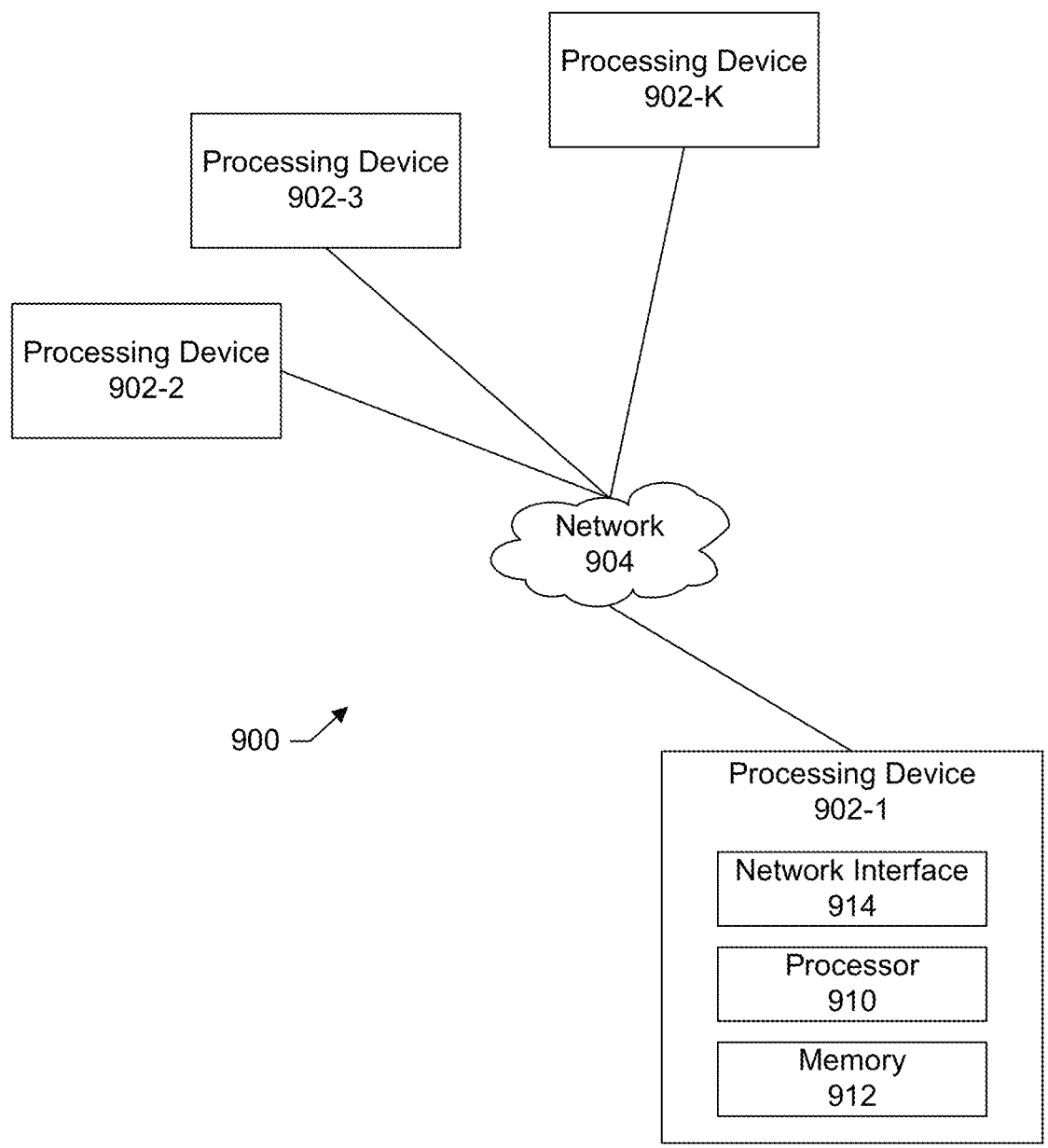
FIG. 9 shows another block diagram of a processing platform that may be utilized to implement at least a portion of an information processing system, according to one or more embodiments.

FIG. 9 shows an example of a processing platform 900. The processing platform 900 in this embodiment comprises a portion of system 100 and includes a plurality of processing devices, denoted 902-1, 902-2, 902-3, . . . 902-K, which communicate with one another over a network 904.

The network 904 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 902-1 in the processing platform 900 comprises a processor 910 coupled to a memory 912.

The processor 910 may comprise a microprocessor, a microcontroller, an application-specific integrated circuit (ASIC), a field-programmable gate array (FPGA) or other type of processing circuitry, as well as portions or combinations of such circuitry elements.

The memory 912 may comprise random access memory (RAM), read-only memory (ROM) or other types of memory, in any combination. The memory 912 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 902-1 is network interface circuitry 914, which is used to interface the processing device with the network 904 and other system components, and may comprise conventional transceivers.

The other processing devices 902 of the processing platform 900 are assumed to be configured in a manner similar to that shown for processing device 902-1 in the figure.

Again, the particular processing platform 900 shown in the figure is presented by way of example only, and system 900 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxRack™ FLEX, VxBlock™, or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of an information processing system as disclosed herein can be implemented at least in part in the form of one or more software programs stored in memory and executed by a processor of a processing device. For example, at least portions of the functionality of one or more components of the compute services platform 100 are illustratively implemented in the form of software running on one or more processing devices.

Figure 10:
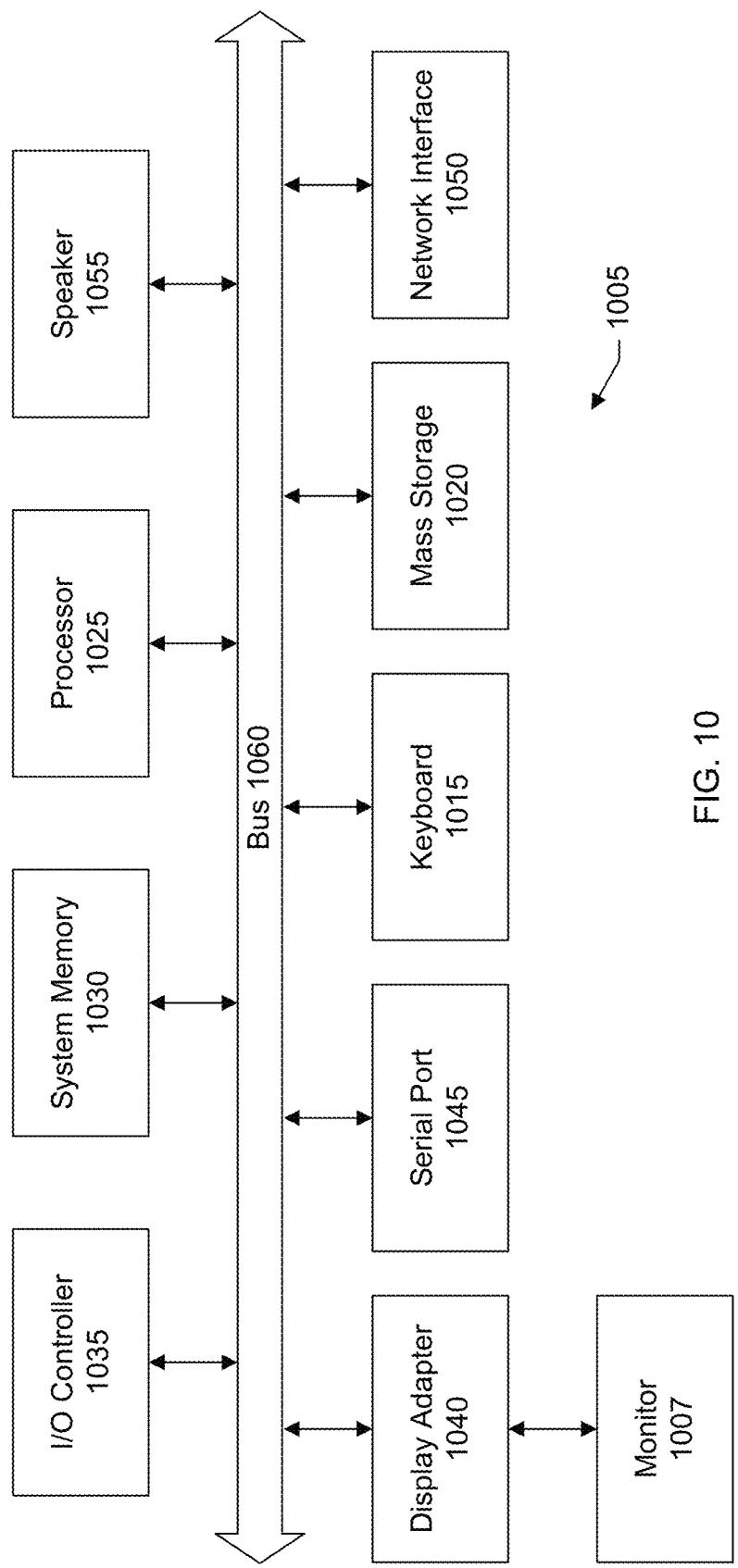
FIG. 10 shows a block diagram of a computer system suitable for use with the information processing system, according to one or more embodiments.

FIG. 10 shows a system block diagram of a computer system 1005 used to execute the software of the present system described herein. The computer system includes a monitor 1007, keyboard 1015, and mass storage devices 1020. Computer system 1005 further includes subsystems such as central processor 1025, system memory 1030, input/output (I/O) controller 1035, display adapter 1040, serial or universal serial bus (USB) port 1045, network interface 1050, and speaker 1055. The system may also be used with computer systems with additional or fewer subsystems. For example, a computer system could include more than one processor 1025 (i.e., a multiprocessor system) or a system may include a cache memory.

Arrows such as 1060 represent the system bus architecture of computer system 1005. However, these arrows are illustrative of any interconnection scheme serving to link the subsystems. For example, speaker 1055 could be connected to the other subsystems through a port or have an internal direct connection to central processor 1025. The processor may include multiple processors or a multicore processor, which may permit parallel processing of information. Computer system 1005 shown in FIG. 10 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system may be one of the Microsoft Windows®. family of systems (e.g., Windows Server), Linux, Mac OS X®, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless. For example, signals from a computer may be transferred, at least in part, wirelessly to components or other computers.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above.

What is claimed is:

1. A method of drive letter mapping comprising:
    scanning a virtual disk file, while a virtual disk representing the virtual disk file is offline, to obtain a binary signature indicating the virtual disk as being one of a Master Boot Record (MBR) partitioned disk type or a Globally Unique Identifier Partition Table (GPT) partitioned disk type;
    obtaining a disk signature for the MBR partitioned disk;
    obtaining a volume Globally Unique Identifier (GUID) for the GPT partitioned disk;
    identifying partitions of the virtual disk;
    locating a system registry hive file;
    reading, from the system registry hive file, a MountedDevices entry to obtain a drive letter and one or more other values associated with the drive letter stored in the MountedDevices entry;
    when the virtual disk is the GPT partitioned disk type, checking the MountedDevices entry for a DMIO:ID signature indicating that the drive letter represents a fixed-disk, and
    excluding removable disks from the drive letter mapping by identifying any entry having values beginning with "5c" or "5a," an entry having values beginning with "5c" or "5a" indicating that the entry is associated with a removable disk;
    correlating one of the disk signature for the MBR partitioned disk or the volume GUID for the GPT partitioned disk against the one or more other values associated with the drive letter stored in the MountedDevices entry; and
    based on the correlation, mapping the drive letter to an identified partition.

2. The method of claim 1 wherein the locating the system registry hive file further comprises:
    selecting a partition;
    issuing, for the selected partition, an extraction command specifying the system registry hive file; and
    repeating the selecting a partition and issuing of the extraction command until the system registry hive file is found.

3. The method of claim 1 wherein the correlating further comprises:
    when the virtual disk is the MBR partitioned disk type, correlating first and second values of the one or more other values associated with the drive letter against the disk signature, and starting and ending partition offsets of the identified partition, respectively,
    wherein the second value corresponds to a partition offset that is within the starting and ending partition offsets of the identified partition.

4. The method of claim 1 wherein the correlating further comprises:
    when the virtual disk is the GPT partitioned disk type, verifying that the MountedDevices entry represents a dynamic device identifier; and
    upon the verification, correlating a value of the one or more values associated with the drive letter to the volume GUID of the identified partition.

5. The method of claim 1 wherein a virtual machine using the virtual disk is powered off.

6. The method of claim 1 wherein the partitions comprise New Technology File System (NTFS) partitions.

7. A system for drive letter mapping, the system comprising: a processor; and memory configured to store one or more sequences of instructions which, when executed by the processor, cause the processor to carry out the steps of:
    scanning a virtual disk file, while a virtual disk representing the virtual disk file is offline, to obtain a binary signature indicating the virtual disk as being one of a Master Boot Record (MBR) partitioned disk type or a Globally Unique Identifier Partition Table (GPT) partitioned disk type;
    obtaining a disk signature for the MBR partitioned disk;
    obtaining a volume Globally Unique Identifier (GUID) for the GPT partitioned disk;
    identifying partitions of the virtual disk;
    locating a system registry hive file;
    reading, from the system registry hive file, a MountedDevices entry to obtain a drive letter and one or more other values associated with the drive letter stored in the MountedDevices entry;
    when the virtual disk is the GPT partitioned disk type, checking the MountedDevices entry for a DMIO:ID signature indicating that the drive letter represents a fixed-disk; and
    excluding removable disks from the drive letter mapping by identifying any entry having values beginning with "5c" or "5a," an entry having values beginning with "5c" or "5a" indicating that the entry is associated with a removable disk;
    correlating one of the disk signature for the MBR partitioned disk or the volume GUID for the GPT partitioned disk against the one or more other values associated with the drive letter stored in the MountedDevices entry; and
    based on the correlation, mapping the drive letter to an identified partition.

8. The system of claim 7 wherein the locating the system registry hive file further comprises:
    selecting a partition;
    issuing, for the selected partition, an extraction command specifying the system registry hive file; and
    repeating the selecting a partition and issuing of the extraction command until the system registry hive file is found.

9. The system of claim 7 wherein the correlating further comprises:
    when the virtual disk is the MBR partitioned disk type, correlating first and second values of the one or more other values associated with the drive letter against the disk signature, and starting and ending partition offsets of the identified partition, respectively, wherein the second value corresponds to a partition offset that is within the starting and ending partition offsets of the identified partition.

10. The system of claim 7 wherein the correlating further comprises:
when the virtual disk is the GPT partitioned disk type,
verifying that the MountedDevices entry represents a dynamic device identifier; and
upon the verification, correlating a value of the one or more values associated with the drive letter to the volume GUID of the identified partition.

11. The system of claim 7 wherein a virtual machine using the virtual disk is powered off.

12. The system of claim 7 wherein the partitions comprise New Technology File System (NTFS) partitions.

13. A computer program product, comprising a non-transitory computer-readable medium having a computer-readable program code embodied therein, the computer-readable program code adapted to be executed by one or more processors to implement a method of drive letter mapping comprising:
scanning a virtual disk file, while a virtual disk representing the virtual disk file is offline, to obtain a binary signature indicating the virtual disk as being one of a Master Boot Record (MBR) partitioned disk type or a Globally Unique Identifier Partition Table (GPT) partitioned disk type;
obtaining a disk signature for the MBR partitioned disk;
obtaining a volume Globally Unique Identifier (GUID) for the GPT partitioned disk;
identifying partitions of the virtual disk;
locating a system registry hive file;
reading, from the system registry hive file, a MountedDevices entry to obtain a drive letter and one or more other values associated with the drive letter stored in the MountedDevices entry;
when the virtual disk is the GPT partitioned disk type, checking the MountedDevices entry for a DMIO:ID signature indicating that the drive letter represents a fixed-disk, and
excluding removable disks from the drive letter mapping by identifying any entry having values beginning with "5c" or "5a," an entry having values beginning with "5c" or "5a" indicating the entry is associated with a removable disk;
correlating one of the disk signature for the MBR partitioned disk or the volume GUID for the GPT partitioned disk against the one or more other values associated with the drive letter stored in the MountedDevices entry; and
based on the correlation, mapping the drive letter to an identified partition.

14. The computer program product of claim 13 wherein the locating the system registry hive file further comprises:
selecting a partition;
issuing, for the selected partition, an extraction command specifying the system registry hive file; and
repeating the selecting a partition and issuing of the extraction command until the system registry hive file is found.

15. The computer program product of claim 13 wherein the correlating further comprises:
when the virtual disk is the MBR partitioned disk type, correlating first and second values of the one or more other values associated with the drive letter against the disk signature, and starting and ending partition offsets of the identified partition, respectively,
wherein the second value corresponds to a partition offset that is within the starting and ending partition offsets of the identified partition.

16. The computer program product of claim 13 wherein the correlating further comprises:
when the virtual disk is the GPT partitioned disk type,
verifying that the MountedDevices entry represents a dynamic device identifier; and
upon the verification, correlating a value of the one or more values associated with the drive letter to the volume GUID of the identified partition.

17. The computer program product of claim 13 wherein a virtual machine using the virtual disk is powered off.

18. The computer program product of claim 13 wherein the partitions comprise New Technology File System (NTFS) partitions.

* * * * *